United States Patent [19]

Maus et al.

[11] Patent Number: 4,974,713
[45] Date of Patent: Dec. 4, 1990

[54] FLUID FRICTION CLUTCH

[75] Inventors: Ralf Maus, Korntal; Kurt Klein, Vaihingen/Enz-Aurich, both of Fed. Rep. of Germany

[73] Assignee: Süddeutsche Kühlerfabrik Julius Fr. Behr GmbH & Co. KG, Fed. Rep. of Germany

[21] Appl. No.: 398,412

[22] Filed: Aug. 25, 1989

[30] Foreign Application Priority Data

Sep. 2, 1988 [DE] Fed. Rep. of Germany ....... 3829809

[51] Int. Cl.$^5$ .............................................. F16D 35/02
[52] U.S. Cl. ................................. 192/58 B; 192/82 T
[58] Field of Search .......................... 192/58 B, 82 T; 123/41.12

[56] References Cited

U.S. PATENT DOCUMENTS

| 3,840,101 | 10/1974 | Peter et al. ............... | 192/58 B |
| 4,485,902 | 12/1984 | Storz ......................... | 192/58 B |
| 4,817,774 | 4/1989 | Digele ........................ | 192/58 B |

FOREIGN PATENT DOCUMENTS 3041829 5/1982 Fed. Rep. of Germany.
3536456 4/1987 Fed. Rep. of Germany.
3719279 3/1988 Fed. Rep. of Germany .... 192/58 B
57-1829 1/1982 Japan ................................ 192/58 B

*Primary Examiner*—Richard Lorence
*Attorney, Agent, or Firm*—Evenson, Wands, Edwards, Lenahan & McKeown

[57] ABSTRACT

Normally, fluid friction clutch having cup disks, in order to permit the circulating of clutch fluid in the relatively small cylindrical ring gap between the housing and the cup disk, must be provided with thread-type conveying grooves. According to the invention, these expenditures are avoided in that the cup disk, on its closed side, is provided with a surrounding edge which projects beyond the cylindrical circumferential surface radially toward the outside and which is flush with the front face of the cup disk. Radial grooves preferably lead into this edge and are provided at the front face. The cup disk preferably be combined with axially extending notches in the cylindrical ring surface of the housing and with conical openings by means of which an intense circulation of the coupling fluid is ensured. The clutch is to be used for the drive of fans for vehicle engines.

15 Claims, 3 Drawing Sheets

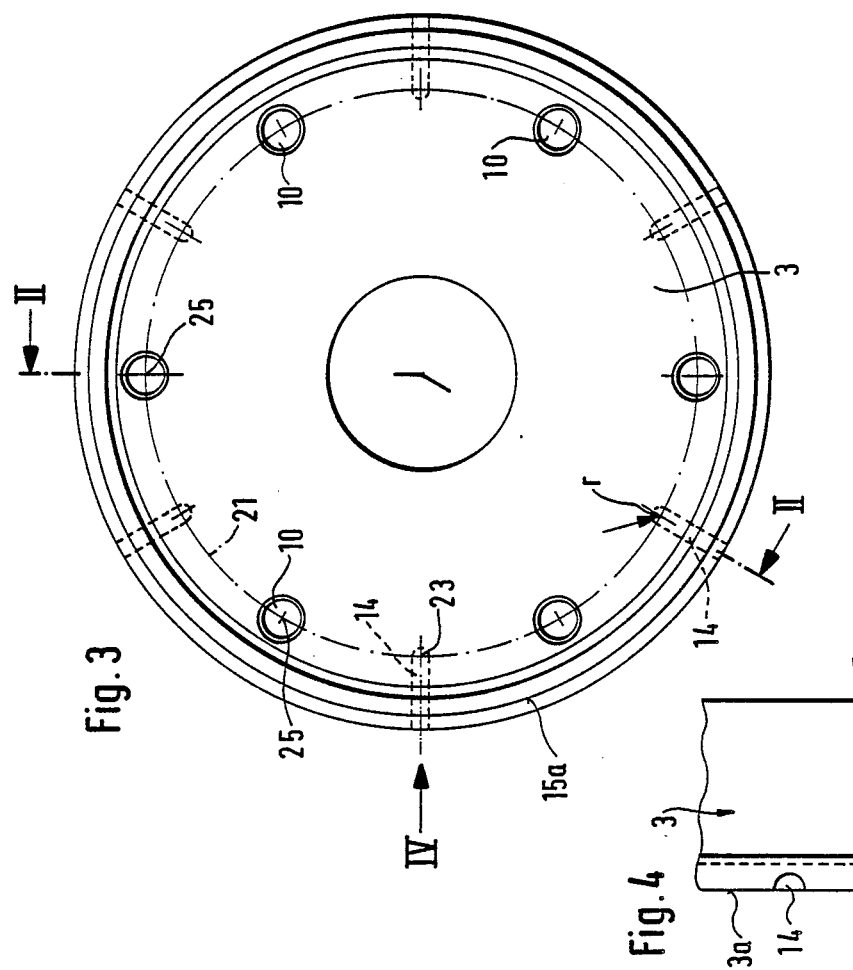
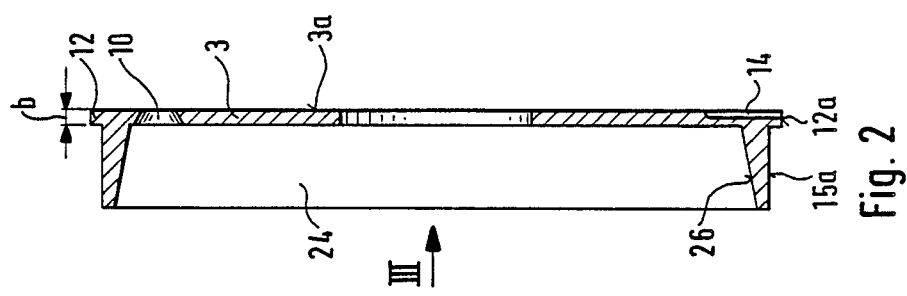

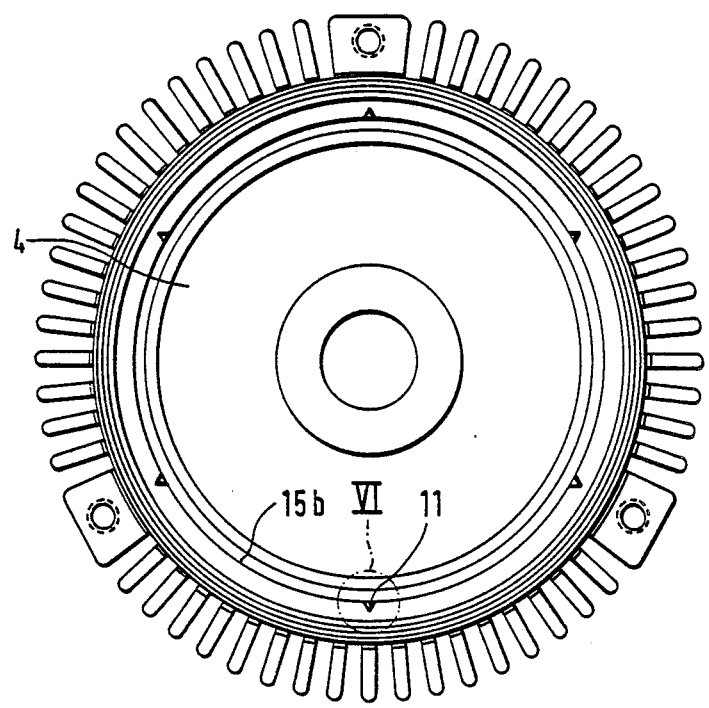
Fig. 5
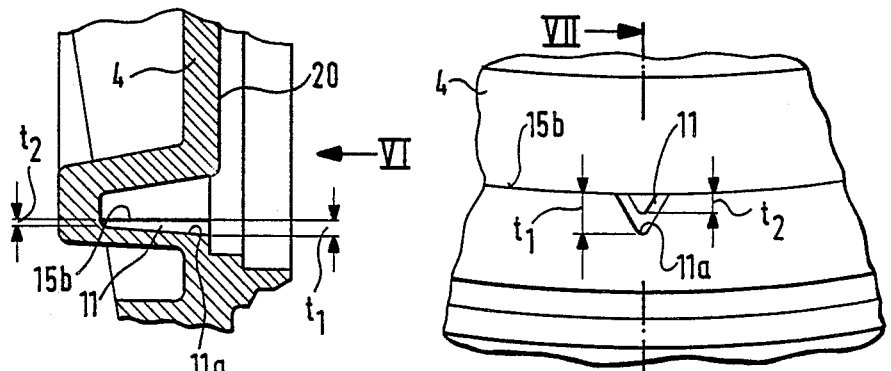
Fig. 7
Fig. 6

FLUID FRICTION CLUTCH

BACKGROUND AND SUMMARY OF THE INVENTION

The invention relates to a fluid friction clutch of the type having a cup disk, a housing surrounding the cup disk forming a working chamber formed as a cylindrical ring gap with a circumferential surface of the cup disk. A surrounding clutch fluid collecting groove with a back pressure body and a return flow duct are provided for accommodating pumping of clutch fluid between the working chamber and a storage chamber.

A fluid friction clutch of this type is known (DE 30 41 829 C2). In this known clutch construction, thread-type grooves are provided in the cylindrical circumferential surface of the cup disk which have the purpose of conveying the clutch fluid located in the working chamber through the ring-shaped shearing gap between the cup disk and the housing to a collecting groove and from there, by way of a back-pressure body, back into the storage chamber. This measure is required particularly in the case of high performances because the circulation of the clutch fluid is very important with respect to the necessary cooling. In order to compensate the disadvantage of the low height of the ring-shaped shearing gap at the cylindrical transmission surface, the thread-type grooves are provided. However, the manufacturing of the cup disks for such a fluid friction clutch is relatively expensive. As a result of the arrangement of the collecting groove which still projects into the cylindrical area of the circumferential surface of the cup disk, the effective transmission surface is also reduced by the amount of the groove width.

An object of the invention is to develop a fluid friction clutch of the initially mentioned type in such a manner that the quantity of the circulating clutch fluid becomes as large as possible but without the requirement of thread-type grooves in the circumferential surface of the cup disk or of other expensive measures.

In order to achieve this object, an arrangement is provided wherein the cup disk is provided with an edge portion extending radially outwardly of the circumferential surface and projecting into the surrounding collecting groove. By means of this development, the shearing gap with respect to the cylindrical circumferential surface of the cup disk, in its front area, is shifted slightly radially toward the outside. Because of the fact that the space of the collecting groove is therefore set off from the actual working space to a larger diameter toward the outside, it is ensured that the clutch fluid, which affects the torque transmission, is completely withdrawn from the working gap. This measure therefore permits the circulating of a large quantity of clutch fluid without requiring costly measures for this purpose.

The conveying of the clutch fluid back into the storage space is also promoted in especially preferred embodiments wherein the front face of the cup disk is provided with radially extending grooves which lead into a circumferential surface of the edge. In certain preferred embodiments at least three grooves are provided uniformly around the circumference of the cup disk. The radial grooves, which lead radially into the area of the edge and its circumferential surface, exercise an additional pumping effect and provide mainly that, even in the case of small rotational speed differences, the clutch fluid located in the gap between the front face of the cup disk and the partition moves radially toward the outside, while always wetting the working gap in a uniform manner and thus providing that rotational speed fluctuations, particularly in the case of a small amount of fluid, are excluded as much as possible.

In certain preferred embodiments of the new fluid friction clutch, arrangements are provided wherein conical openings are provided in a radially exterior area of the cup disk, in which the grooves are also arranged and located on a diameter which is larger than the diameter on which the inlet opening means is located and wherein the center points of the conical openings are located on a circle on which the center points of the radii (r) which close off the grooves radially toward the inside are also located. These features result in the advantage that the clutch fluid, which flows in from the inlet bore in a temperature-controlled manner, can also reach the rear area of the cup disk and the rear area of the working chamber as fast as possible. For this purpose, the conical bores are arranged on a radius which is identical to or larger than that on which the inlet opening is located.

Certain preferred embodiments include arrangements wherein axially or approximately axially extending notches are provided which lead into the collecting groove in the ring surface of the housing which extends in parallel to the circumferential surface of the cup disk. Also arrangements are provided wherein the notches are provided with a profile of varying depth ($t_1$, $t_2$), the largest depth ($t_1$) of the notches being located in the area of the collecting groove. These features result in the advantage that the wetting of the transmission surfaces with the clutch fluid is promoted, as mentioned above, in the case of a working gap, which as a rule is very narrow, for example, 0.2 mm. The axially extending notches can easily fill with the clutch fluid and therefore provide a uniformly increasing wetting. The conical shape of these notches results in an advantageous conveying effect in the direction of the collecting groove.

Especially preferred embodiments are also provided wherein the diameter (D) of the edge of the cup disk corresponds to approximately the diameter on which the tread of the axially extending notches is located at the point of their greatest depth ($t_1$), and wherein the edge of the cup disk has an axial width (b) which corresponds to approximately the width (a) of the back-pressure body means such embodiments have proven to be particularly effective for the method of operation of the new clutch.

Other objects, advantages and novel features of the present invention will become apparent from the following detailed description of the invention when considered in conjunction with the accompanying drawings.

BRIEF DESCRIPTION OF THE DRAWINGS

FIG. 2 is a longitudinal sectional view of the cup disk used in the embodiment of FIG. 1, viewed along Line II—II of FIG. 3;

FIG. 3 is a rear view of the cup disk of FIG. 2, viewed in the direction of arrow III of FIG. 2;

FIG. 4 is an enlarged detail of the cup disk of FIG. 3, taken in the direction of arrow IV in FIG. 3;

FIG. 5 is a schematic view of the housing of the fluid friction clutch of FIG. 1 without the cup disk;

FIG. 6 is an enlarged representation of the partial area which in FIG. 5 has the edge VI; and FIG. 7 is a sectional view of the partial area of FIG. 6 along section Line VII—VII.

DETAILED DESCRIPTION OF THE DRAWINGS

Figure 1:
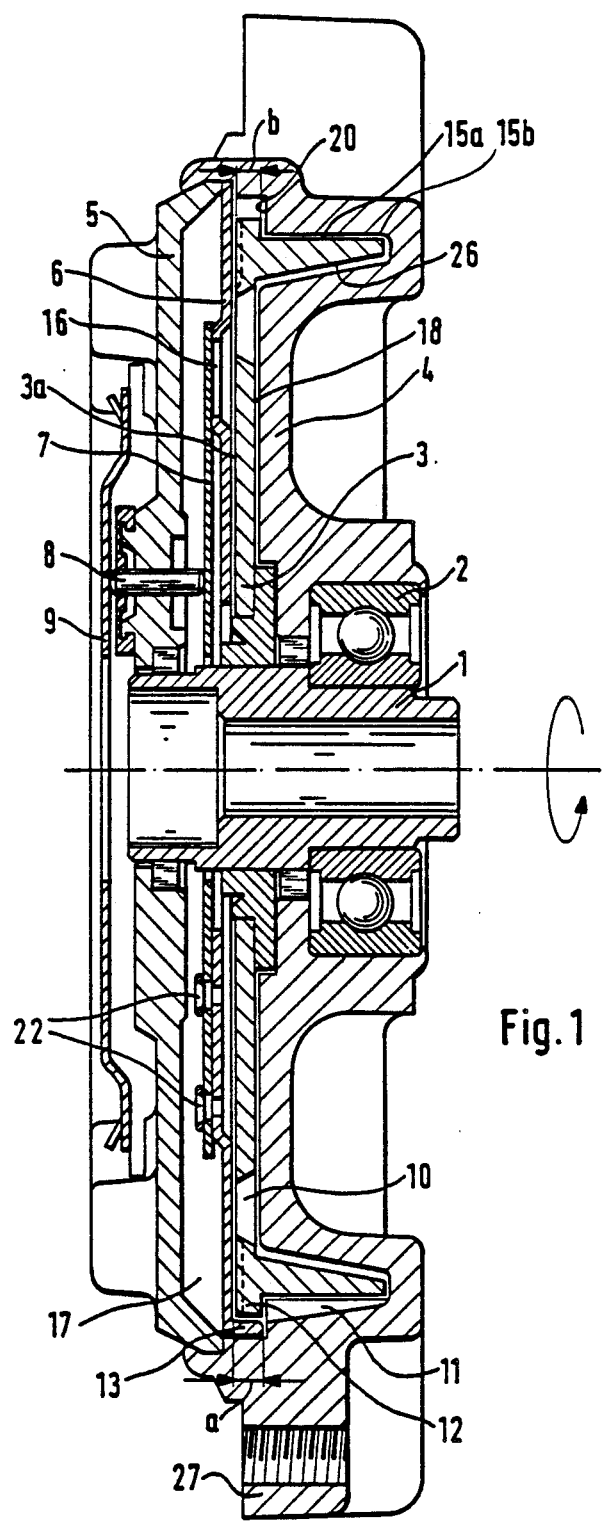
FIG. 1 is a schematic longitudinal sectional view of a temperature-controlled fluid friction clutch constructed according to the invention.

FIG. 1 shows a fluid friction clutch which is used for the start of the fan for the radiator of an automobile engine. The new fluid friction clutch, in a manner not shown in detail is connected with a driven shaft, for example, directly with the crankshaft of the engine by means of a central screw bolt which can be introduced into a hollow drive shaft. A cup disk 3 is non-rotatably connected with the hollow shaft 1 and rotates in a working chamber 18 which is formed inside a housing 4. The housing 4, which is covered by a cover 5, is rotatably disposed on the hollow drive shaft 1 by means of a roller bearing 2. Between the cover 5 and the housing 4, a partition 6 is provided which separates the working chamber 18 from a storage chamber 17 which is formed essentially in the cover 5 and which may be partially filled with a clutch fluid, such as silicone fluid.

On the exterior side of the cover 5, a bimetallic strip 9 is provided in manner which is known per se which forms a ring-shaped opening in its center for the guiding-through of the screw bolt and which presses on an actuating bolt 8 which extends tightly through the cover 5 into the storage chamber 17 and there rests against a valve lever 7. The valve lever 7, on one side, is fastened to the partition 6 by means of two fastening rivets 22 and, in the illustrated position, is disposed with its freely movable end in front of an inlet opening 16 in the partition 6 through which the clutch fluid can enter from the storage chamber 17 into the working chamber 18 when—as a function of the temperature—the valve lever 7 unblocks the opening 16. In this case, the clutch fluid enters into the working chamber 18 and fills the shearing gap between the cylindrical circumferential surfaces 15a of the cup disk 3 and of the cylindrical wall 15b of the housing, and also the outer area of the ring gap between the partition 6 and the front face 3a of the cup disk 3. According to the filling ratio, the housing 4 is therefore taken along by the driven cup disk 3. The housing 4 has fastening tongues 27 to which the fan blades may be fastened directly. This type of a fluid friction clutch—in a manner which is known per se—therefore permits a temperature-dependent rotational speed control of the fan for the radiator of a motor vehicle engine.

FIG. 1, and particularly also FIGS. 2, 3 and 4 show that the cup disk 3 has an edge 12 which projects radially beyond the cylindrical circumferential surface 15a and, on one side, is flush with the front face 3a of the cup disk 3. Six radially extending grooves 14 having a semicircular cross-section extend into the circumferential surface 12a of the edge 12 and extend, from the circumferential surface 12a of the edge 12, toward which they are open, radially toward the inside into the area of a circle 21 which extends in the outer area of the circular front face 3a and, in the case of the illustrated embodiment, takes up slightly more than two thirds of the diameter of the front face 3a. The center points 23 of the end radii (r) of the grooves 14 are located on this circle 21 and otherwise are distributed uniformly on the circumference, each being displaced by 60° with respect to one another.

As also shown in FIG. 1, 2 and 3, the cup disk 3 is Provided with six conical bores 10 which also are uniformly distributed on the circumference and expand from the front face 3a of the cup disk toward the inner hollow space 24 of the cup disk 3. The bores 10 are arranged such that they are each displaced by 30° with respect to adjacent grooves 40 and by 60° with respect to adjacent bores 10. In the embodiment illustrated, their center points 25 are also located on the circle 21.

As shown in FIG. 1, the cup disk 3 projects with its edge 12 into a collecting groove 20 which extends radially from the cylindrical wall 15b of the housing 4 toward the outside. In the collecting groove, a back-pressure body 13 is arranged which, in a manner not shown in detail, provides that the clutch fluid accumulating in the collecting groove 20 can be pumped back into the storage chamber 17 by means of a return flow opening. The width (b) of the edge 12 of the cup disk 3 is in this case dimensioned such that it corresponds to approximately the width (a) of the back-pressure body and approximately to the width of the collecting groove 20. The height of the edge 12 is selected such that the edge can pass by radially inside but adjacent to the back-pressure body 13.

As shown in FIGS. 5 to 7, axially extending notches 11 are also provided in the housing 4 of which also six are uniformly distributed on the circumference of the cylindrical ring surface 15b of the housing 4, each being displaced by 60° with respect to one another. The notches 11 have a varying depth $(t_1)$, $(t_2)$. Their tread 11a (the line of the notch 11) therefore extends diagonally with respect to the cylindrical housing surface 15b, specifically in such a fashion that the notch 11 has its largest depth $(t_1)$ on the side facing the edge 12 or the back-pressure body 13. In addition, the diameter of the edge 12 is dimensioned such that it is approximately in the magnitude of the diameter on which the tread 11a of the notches 11 is also located at the point of their greatest depth $(t_1)$, i.e., at the point where they lead into the collecting groove 20.

The new fluid friction clutch operates as follows: When the fluid supply is introduced from the storage chamber 17 into the working chamber 18 by the opening-up of the inlet opening 16, the clutch fluid moves very fast from the area of the inlet opening 16, by way of the conical bores 10, also to the rear side of the cup disk and, as the result of the conical construction of the interior wall 26 of the cup disk 3, by means of the rotation of the driven cup disk 3, very rapidly reaches the rear edge of the cup disk and, from there, can enter into the shearing gap between the cylindrical surfaces (15a and 15b). However, in parallel, the clutch fluid is also guided by means of the effect of the grooves 14 from the inlet area into the radially extending ring gap between the front face 3a and the partition 6. In this case, the clutch fluid distributes itself very rapidly in a uniform fashion which has the result that no rotational speed fluctuations will occur even if only small amounts of clutch fluid are supplied. By means of the arrangement of the radially projecting edge, the clutch fluid which is located in the shearing gap between the ring surfaces 15a, 15b is, however, also conveyed into the collecting groove 20, which is promoted by the notches 11 which are uniformly distributed on the circumference of the housing 4. Because of its dimensioning, the edge 12, in its area located on the front face 3a, but also on the other side, operates as a shearing surface, but simultaneously also, together with the notches 11, as a pumping device in order to convey the clutch fluid back into the storage space 17 as fast as possible. By means of the new construction, a very intense circulation of clutch fluid can be achieved also when the fluid quantities are low. The clutch can therefore operate without any pressure and in a modulating fashion, i.e., continuously connecting, but also has the advantage that the heat generated in the shearing gaps can also be removed very fast because of the larger circulating amount of fluid. The thermal stress to the clutch is therefore relatively low. Couplings of the new type can therefore be used for the transmission of greater forces. However, because of its construction, the new clutch also has the advantage that it has a better cold-starting behavior, because, during the starting, the clutch fluid, in the above-mentioned manner, is withdrawn very rapidly from the shearing surfaces. Finally, it also has an excellent control behavior.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A fluid friction clutch comprising:
   a cup disk having a circumferential surface,
   a housing surrounding the cup disk, said housing having an interior wall and a working chamber which forms a cylindrical ring gap with the circumferential surface of the cup disk, said cup disk and said housing being rotatable relative to one another,
   a partition bordering on a front face of the cup disk and separating the working chamber from a storage chamber,
   means for selectively controlling communication of clutch fluid between the storage chamber and the working chamber as a function of temperature,
   a surrounding clutch fluid collecting groove formed in the interior wall of the housing, and
   a back pressure body and a return flow duct communicating with the collecting groove, the back pressure body, the return flow duct and the collecting groove accommodating the pumping of clutch fluid from the working chamber into the storage chamber,
   wherein the cup disk is provided with an edge portion that is a radially outermost portion of the cup disk and extending radially outwardly of the circumferential surface and projecting into the surrounding collecting groove and said back pressure body is located in the collecting groove radially outside of the edge portion.

2. A fluid friction clutch according to claim 1, wherein the front face of the cup disk is provided with radially extending grooves which lead into a circumferential surface of the edge.

3. A fluid friction clutch according to claim 2, wherein the grooves are provided only int eh radially outer area of the front face of the cup disk.

4. A fluid friction clutch according to claim 3, wherein at least three of said grooves are provided which are distributed uniformly around the circumference of the cup disk.

5. A fluid friction clutch according to claim 4, wherein conical openings are distributed in the cup disk between the grooves and expand from the front face of the cup disk into a hollow space of the cup disk.

6. A fluid friction clutch according to claim 5, wherein the conical openings are provided in a radially exterior area, in which the grooves are also arranged and located on a diameter which is larger than a diameter on which the inlet opening means is located.

7. A fluid friction clutch according to claim 6, wherein center points of the conical openings are located on a circle on which center points of the radii (r) which close off the grooves radially toward the inside are also located.

8. A fluid friction clutch according to claim 1, wherein axially or approximately axially extending notches are proved which lead into the collecting groove in a ring surface of the housing which extends in parallel to the circumferential surface of the cup disk.

9. A fluid friction clutch according to claim 8, wherein the notches are provided with a profile of varying depth, the largest of the notches being located in the area of the collecting groove.

10. A fluid friction clutch according to claim 8, wherein at least three of said notches are distributed uniformly on the circumference of the housing.

11. A fluid friction clutch according to claim 8, wherein the diameter (D) of the edge of the cup disk corresponds to approximately the diameter on which a tread of the axially extending notches is located at a point of their greatest depth.

12. A fluid friction clutch according to claim 1, wherein the edge of the cup disk has an axial width (b) which corresponds to approximately a width (a) of the back-pressure body means.

13. A fluid friction clutch according to claim 9, wherein at least three of said notches are distributed uniformly on the circumference of the housing.

14. A fluid friction clutch according to claim 9, wherein the diameter (D) of the edge of the cup disk corresponds to approximately the diameter on which a tread of the axially extending notches is located at a point of their greatest depth.

15. A fluid friction clutch according to claim 10, wherein the diameter (D) of the edge of the cup disk corresponds to approximately the diameter on which a tread of the axially extending notches is located at a point of their greatest depth.

* * * * *